July 24, 1951

F. J. KOGEL 2,561,628

INTERNAL-COMBUSTION ENGINE OF THE LIQUID
FUEL INJECTION TYPE

Filed Sept. 2, 1947

2 Sheets-Sheet 1

INVENTOR.
FRANK J. KOGEL.
BY
K. A Fauchin

July 24, 1951    F. J. KOGEL    2,561,628
INTERNAL-COMBUSTION ENGINE OF THE LIQUID
FUEL INJECTION TYPE
Filed Sept. 2, 1947    2 Sheets-Sheet 2

INVENTOR.
FRANK J. KOGEL.

Patented July 24, 1951

2,561,628

UNITED STATES PATENT OFFICE 2,561,628

INTERNAL-COMBUSTION ENGINE OF THE LIQUID FUEL INJECTION TYPE

Frank J. Kogel, Burbank, Calif.

Application September 2, 1947, Serial No. 771,772

1 Claim. (Cl. 123—32)

The present invention relates to internal combustion engines of the liquid fuel injection type and more particularly to the combustion chambers thereof. It is especially intended for internal combustion engines of the high compression type wherein the compression stroke of the piston is arranged to produce sufficiently high degrees of compression in the combustion chamber to cause ignition of the fuel mixture.

Broadly it is an object of the present invention to improve the performance of engines of the type characterized.

It is another object of the present invention to furnish an arrangement, for engines of the type referred to, which provides more efficient utilization of the fuel supplied thereto.

Additionally it is an object of this invention to furnish an arrangement, for engines of the type described, which provides rapid distribution and interpenetration of fuel and combustion air, resulting in efficient combustion of the explosive charge thus formed.

More specifically it is an object of the present invention to so arrange a combustion chamber, in engines of the type named, as to obtain controlled turbulence within said chamber yielding practically complete combustion of the resultant air and fuel mixture.

It is another specific object of this invention to so arrange, dispose and form a combustion chamber, in engines of the type referred to, as to obtain such turbulence of the air, forced into said chamber by the compression stroke of the piston, and the fuel, injected thereinto in atomized form, as to cause rapid and thorough mixing of said components and instantaneous and complete combustion of the mixture thus formed.

It is yet another object of this invention to furnish a combustion chamber arrangement of the type referred to wherein carbon precipitation due to incomplete combustion will be maintained at a minimum.

Figure 1:
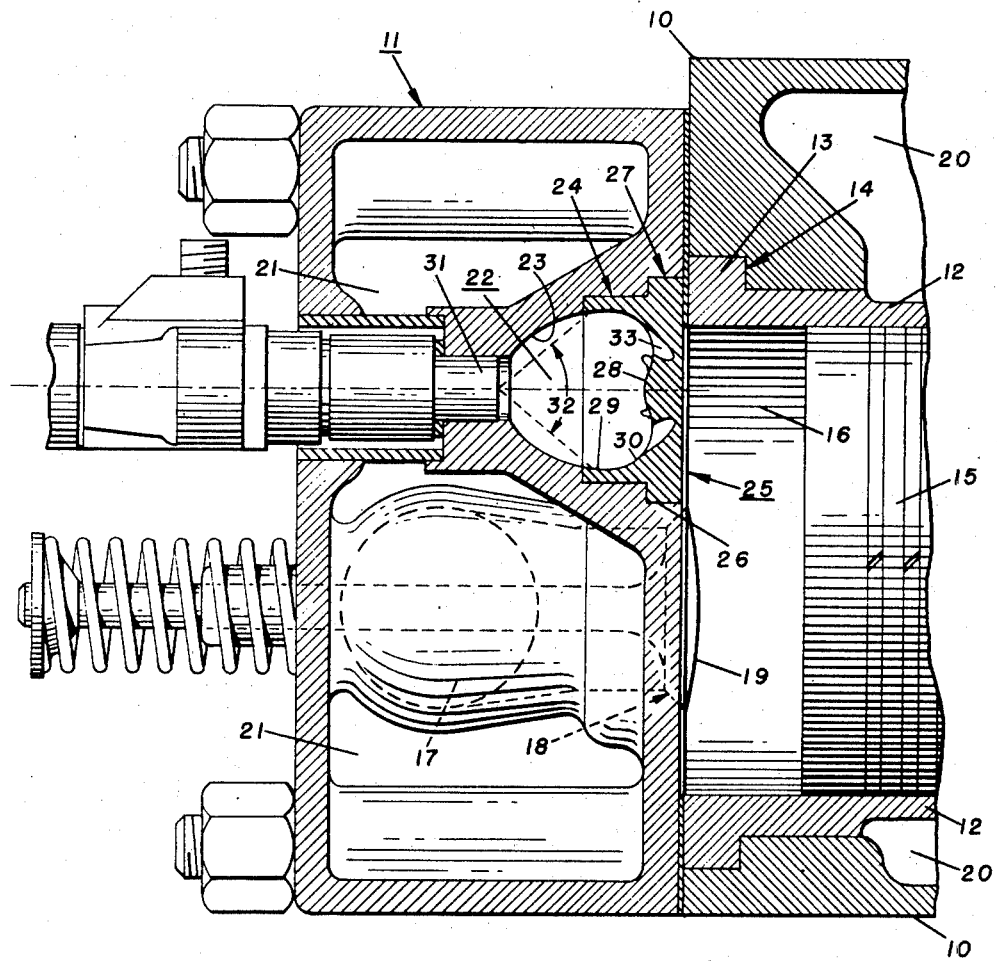
Figure 2:
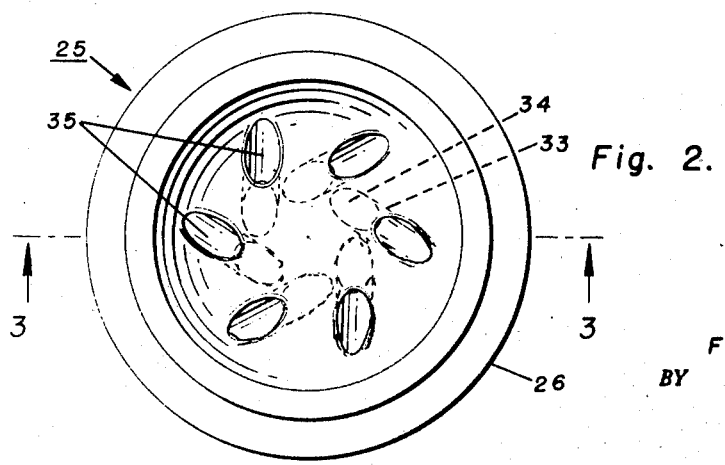
Figure 4:
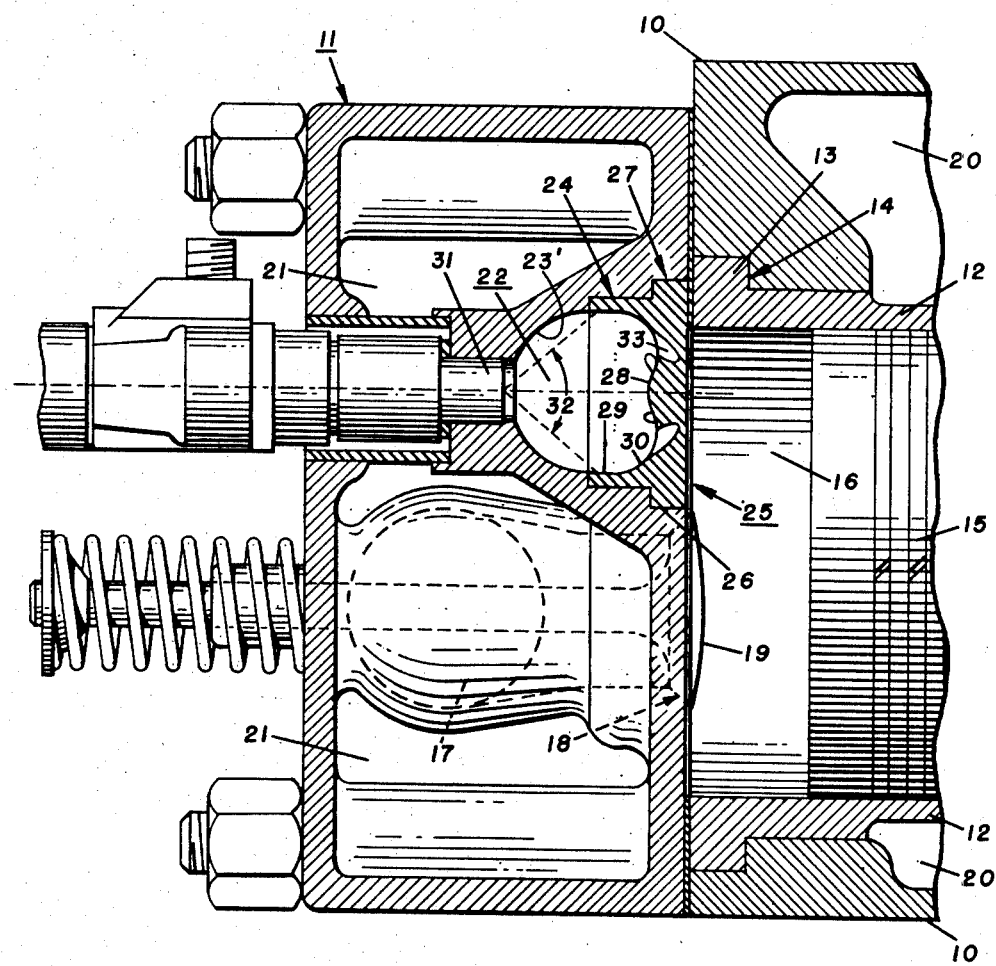
Figure 3:
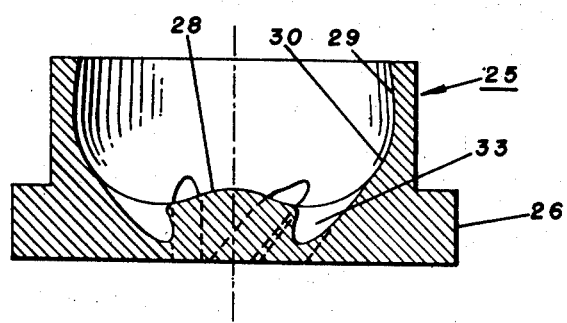

These and other objects of my invention will be apparent from the following description of the accompanying drawing which illustrates certain preferred embodiments thereof and wherein Fig. 1 is a fragmentary sectional view of one of the cylinders of an engine embodying my invention, taken along a plane through the cylinder axis thereof, Fig. 2 is a plan view, on a larger scale than Fig. 1, of the insert which divides the combustion chamber from the cylinder bore, Fig. 3 is a section of the insert shown in Fig. 2 taken along line 3—3 thereof, Fig. 4 is a fragmentary sectional view, similar to Fig. 1, of a modified form of my invention.

Referring to Fig. 1, the numeral 10 designates a cylinder block upon which is mounted a cylinder head 11. The hollow interior of the cylinder block is provided with a liner 12 having an outwardly directed annular flange 13 which engages a corresponding recess 14 arranged in the top portion of the cylinder block. A piston 15 is slidably disposed within the inner cylindrical bore 16 of the cylinder liner 12.

An air inlet passage 17 extends through the cylinder head 11 and leads into the cylinder space 16 through an air inlet port 18 which is controlled by an air inlet valve 19 of conventional design (shown in phantom lines). The cylinder is also provided with the customary valve-controlled outlet passage for the discharge of the combustion products (not shown). The spaces 20 and 21 in the cylinder block and the cylinder head respectively are provided to permit circulation of a suitable cooling medium.

Arranged within the cylinder head 11 and adjacent to the cylinder bore 16 is a combustion chamber 22 which is of circular cross section in planes normal to the cylinder axis. The upper portion of this chamber is formed by a dome-shaped pocket 23 in the cylinder head. The bottom of the dome 23 is abruptly expanded in radial direction as shown in Fig. 1 to form a cylindrical space 24 which opens into the cylinder bore 16 and accommodates a plug or insert 25 preferably made of a heat resistant alloy. This insert 25 has an annular flange or shoulder 26, as shown in Figs. 1, 2, and 3, which engages a corresponding recess 27 in the cylindrical wall 24 of the pocket 23.

The lower face of the insert 25 is flat and lies flush with the top surface of the cylinder space; its upper face, however, forms a cup-shaped depression 28 which constitutes the lower portion of the combustion chamber 22. While the upper portion of this chamber is of dome shape, as previously pointed out, having parabolic (Fig. 1), semi-circular (Fig. 3) or semi-elliptic contours, the lower portion thereof, as formed by the depression in the upper face of the insert 25, comprises a substantially cylindrical area 29 which adjoins the dome 23 and the bottom end of which arches smoothly into a shallow spherical cup 30 having the same main axis as dome 23 (Fig. 3).

Disposed in the zenith of the dome 23 is the injector tip of an atomizer nozzle 31 which is preferably of the pintle type emitting a hollow spray of atomized fuel. The injector tip 31 should be so arranged that the axis of the spray cone coincides with the main axis of the dome 23, and its spray angle 32 should be so related to the dimensions of the described combustion chamber that the surface of said spray cone intersects, or approaches closely, the above mentioned substantially cylindrical area 29 of said chamber.

Reverting to the insert 25, this insert is perforated by six channels 33, of preferably circular cross section, which establish communication between the cylinder bore 16 and the combustion chamber 22. These channels commence with inlet openings 34 arranged in a circle around the center axis of the insert 25 in the flat lower face thereof (Fig. 2) and rise in an oblique tangential direction (Fig. 3) to outlet openings 35 provided in the depressed upper face of said insert 25 where they are preferably arranged in a circle of a larger diameter than the circle formed by the inlet openings 34. Thus, these channels have an axial component with respect to the dome 23, inasmuch as they negotiate the axial distance between the lower and upper faces of the insert 25, and in addition they have a tangential and a radial component so that they enter the combustion chamber 22 at its bottom and adjacent to its circular circumference and smoothly merge tangentially into the contour thereof.

When the compression stroke of the piston 15 forces air from the cylinder space 16 into the combustion chamber 22, the described channels 33 deliver the air into said chamber in a plurality of individual jets or streams of an upwardly inclined tangential direction which enter the bottom of said chamber adjacent to the circumferential wall thereof. Within the chamber these streams impinge obliquely upon, and sweep along, the previously mentioned substantially cylindrical wall 29 complementing one another into a rising whirl pool, which rotates around the main axis of the chamber, and reaches maximum velocity at and along an annular area adjoining the dome 23.

It is into this region of greatest velocity of the swirling air currents, that the nozzle, due to its above described disposition in accordance with my invention, directs the end of its spray cone of atomized fuel. Hence, in the arrangement of my invention the regions of greatest fuel atomization and the regions of greatest air velocity coincide, with the atomized fuel impinging upon the swirling air currents in a direction roughly perpendicular to their direction of movement. In consequence thereof fuel and combustion air are rapidly and most intimately mixed, resulting in instantaneous and nearly complete combustion with a minimum of carbon formation and a maximum in efficiency of operation.

The modified embodiment of my invention illustrated in Fig. 4 agrees in almost all details with the preferred embodiment illustrated in Fig. 1, and like reference numerals in the two figures designate identical or equivalent elements. However, while the dome portion 23 of the combustion chamber 22 in the embodiment illustrated in Fig. 1 is of a parabolic contour, as previously described, the dome 23' of the modified embodiment is of a semi-circular contour.

While I have explained my invention with the aid of exemplary embodiments thereof, I do not wish to be limited to the specific constructional details illustrated and described. Thus, although the main axis of the combustion chamber in the illustrated embodiments is shown to be parallel to the main axis of the cylinders, it will be understood that it may be arranged differently depending upon the contours of the surface which closes off the top of the cylinder bore. Further, while the drawings indicate the exemplary engines to be of the type wherein practically all the air, originally contained in the cylinder space, is compressed into the combustion chamber, my invention is equally applicable to engines wherein only a portion of the air is forced into the combustion chamber with the remainder being compressed at the top of the cylinder bore. Also, the number of the connecting channels 33 between cylinder space and combustion chamber may be greater or smaller than that specifically illustrated, and the cross-sectional contour of these channels need not necessarily be circular, but may for instance be oval. Moreover, while I prefer the use of a fuel injector nozzle of the type emitting a hollow spray cone, satisfactory results may also be obtained with injector nozzles of the type producing a solid cone of atomized fuel.

Having thus described my invention and the manner in which it is to be performed, what I claim is:

In an internal combustion engine of the liquid-fuel-injection compression ignition type, in combination a cylinder, a combustion chamber in the shape of a paraboloid arranged above the top of said cylinder, fuel injection means disposed in the crest of said paraboloid and adapted to deliver a hollow cone of atomized fuel positioned co-axially with said paraboloid, the spray angle of said fuel injection means being so related to the dimensions of said combustion chamber as to place the circular end of said cone adjacent to an annular area at the base of said paraboloid, and a partition between said combustion chamber and said cylinder arranged to present a flat face to said cylinder and an arcuately depressed face to said combustion chamber, said partition containing a plurality of channels leading from points in its flat face arranged in a circle equal angular distances apart around the axis of said paraboloid to circumferentially equi-spaced points in its arcuately depressed face arranged in a circle of larger diameter than said first mentioned circle and pointing in an oblique tangential direction toward said annular area at the base of said paraboloid.

FRANK J. KOGEL.

REFERENCES CITED

The following references are of record in the file of this patent:

UNITED STATES PATENTS

| Number | Name | Date |
|---|---|---|
| 2,058,827 | Ricardo | Oct. 27, 1936 |
| 2,271,606 | Sheppard | Feb. 3, 1942 |
| 2,497,374 | Rouy | Feb. 14, 1950 |

FOREIGN PATENTS

| Number | Country | Date |
|---|---|---|
| 745,367 | France | May 10, 1933 |
| 841,302 | France | Feb. 1, 1939 |
| 517,432 | Great Britain | Jan. 30, 1040 |